United States Patent [19]
Grubzak

[11] Patent Number: 5,540,141
[45] Date of Patent: Jul. 30, 1996

[54] LINEAR ASSEMBLY EXTRUSION ICE CREAM SANDWICH

[76] Inventor: Yancey Grubzak, 6201 W. Patterson Ave., Richmond, Va. 23263

[21] Appl. No.: 487,439

[22] Filed: Jun. 5, 1995

Related U.S. Application Data

[63] Continuation-in-part of Ser. No. 319,377, Oct. 6, 1994, abandoned.

[51] Int. Cl.$^6$ .............................. A21C 9/04; A21C 15/00; A23P 1/00
[52] U.S. Cl. ......................................... 99/450.4; 99/450.7
[58] Field of Search .............. 99/485, 484, 450.1–450.8, 99/494; 53/230, 550, 563, 152, 154, 222–232; 198/430, 468.1, 746; 221/202, 205, 298; 414/791.6, 790.9, 795.3, 790.3, 794.7, 798; 426/94, 103, 274, 275, 524; 425/114

[56] References Cited

U.S. PATENT DOCUMENTS

| | | |
|---|---|---|
| 2,794,404 | 6/1957 | Rapp . |
| 2,868,141 | 1/1959 | Griner ..................................... 99/450.4 |
| 2,923,257 | 2/1960 | Monaco . |
| 3,119,352 | 1/1964 | Fay . |
| 3,316,860 | 5/1967 | Peterson . |
| 3,645,197 | 2/1972 | McMeekin et al. .................... 99/450.4 |
| 3,828,660 | 8/1974 | Mueller et al. ........................ 99/450.7 |
| 3,834,119 | 9/1974 | Armitt et al. . |
| 4,391,832 | 7/1983 | Haas, Sr. et al. ........................ 426/275 |
| 4,421,019 | 12/1983 | Hocking et al. ....................... 99/450.1 |
| 4,440,072 | 4/1984 | Haas, Sr. et al. ...................... 99/450.4 |
| 4,448,012 | 5/1984 | Kauffman et al. . |
| 4,537,121 | 8/1985 | Bero et al. ............................. 99/450.1 |
| 4,584,933 | 4/1986 | Price . |
| 4,612,852 | 9/1986 | Price et al. ............................. 99/450.4 |
| 5,042,638 | 8/1991 | Price . |

*Primary Examiner*—Timothy F. Simone

[57] ABSTRACT

The present invention relates to an apparatus for the sequential assembly of a sandwich-type comestible product, such as an ice cream sandwich, and comprises an essentially horizontal conveyor, sequentially placed wafer dispensing means and an extrusion assembly for the dispensing of a regulated amount of a comestible material. The wafer dispensing means and the extrusion means are mounted in cantilevered fashion on a vertical wall, thereby facilitating the ease of repair, removal for retrofitting and cleaning. In addition, the extruder nozzles and the wafer chutes are individually removable and may be replaced with like components of differing internal diameter, to accommodate the preparation of sandwich-type comestible products of differing size and shape.

6 Claims, 5 Drawing Sheets

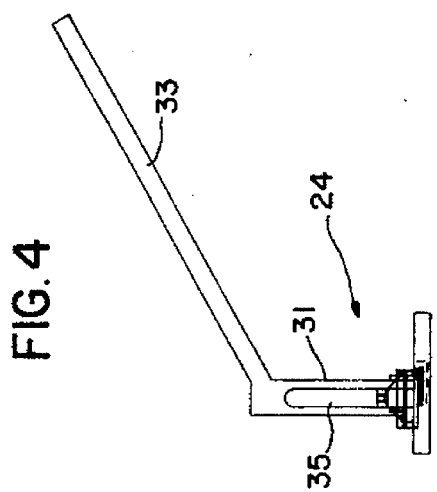
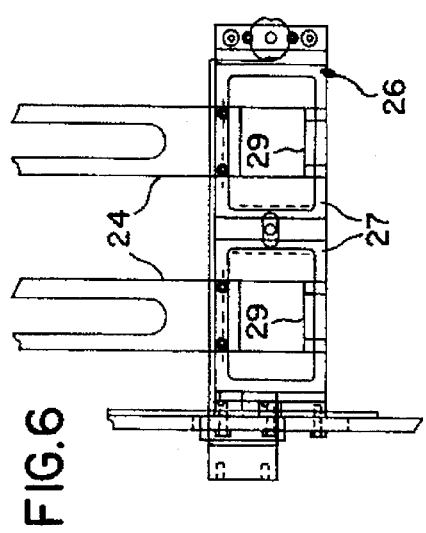
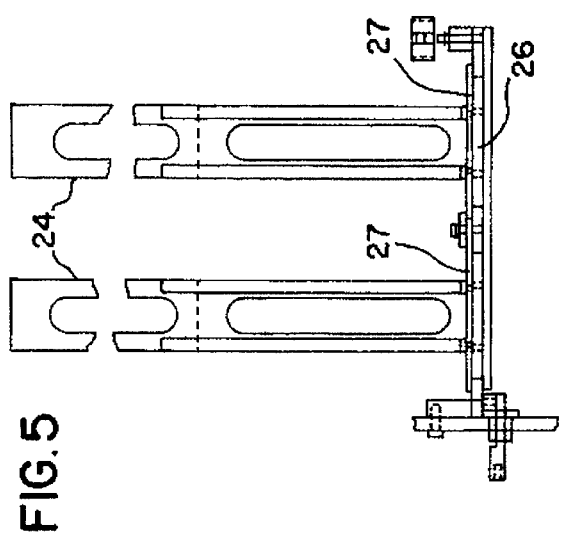

LINEAR ASSEMBLY EXTRUSION ICE CREAM SANDWICH

CROSS REFERENCE TO RELATED APPLICATION

The present application is a continuation-in-part of copending application Ser. No. 08/319,377 filed Oct. 6, 1994 now abandoned by the inventor herein. Applicant claims the benefit of this application under 35 U.S.C. §120.

BACKGROUND OF THE INVENTION

The present invention relates generally to an apparatus for the preparation of comestible-containing sandwich products, and more particularly, to an apparatus that may be utilized to fabricate ice cream sandwiches.

The fabrication of ice cream sandwiches and like sandwich-type comestible products is well-known, and a variety of techniques and corresponding apparatus are likewise available. Generally, ice cream sandwich fabricating apparatus follows the construction and operation best shown in U.S. Pat. No. 2,794,404 to Rapp. In this construction, the product is extruded and assembled while moving in the downward, vertical direction, after which it is placed on a horizontal conveyor for further treatment, as by the wrapping of the individual sandwiches thus prepared. Other patents illustrating this type of equipment include U.S. Pat. No. 3,316,860 to Peterson, U.S. Pat. No. 3,119,353 to Roehn, Jr. and U.S. Pat. No. 3,834,119 to Armitt et al. All of the above are incorporated herein by reference.

In addition, there are disclosed other apparatus for the fabrication of sandwich-type comestible type products. For example, U.S. Pat. No. 2,923,257 to Monaco discloses an apparatus where the fabrication of an extruded sandwich-type comestible product is conducted along a linear track, commencing with the dispensing of a first wafer with its inner side upward, the conveying of said wafer to an extrusion station for the application of a quantity of a flowable comestible material thereon, and the continued conveyance from the extrusion station to a second wafer dispensing station, where the wafer forming the sandwich product is thereupon applied. Likewise, U.S. Pat. No. 3,119,352 to Fay discloses a similar such machine which provides for a plurality of wafer dispensing stations and a specific conformation of the conveyor means for the movement of the assembled wafer products. While both of the aforementioned disclosures reflect that sandwich-type products of this kind may be fabricated in the essentially horizontal direction, there is no explicit disclosure that the apparatus and corresponding method thereof is applicable to the fabrication of ice cream sandwiches.

Further, the manufacture of sandwich-type comestible products concerns is hampered by the inability to adjust the equipment to accommodate different sizes of sandwich products and the economical maintenance of adequate sanitary conditions during the operation of the machines. Specifically, and with respect to ice cream sandwich products, such products are being made in increasing diversity of sizes and shapes. Individuality of such characteristics frequently defies the ability of any given machine to be utilized for their fabrication on an automated basis, as most sandwich machines rely upon the predetermination of the size of the wafer and the corresponding size of the flowable comestible material to be disposed therebetween. To such latter end, the extrusion die or orifice is usually very specifically preliminarily configured and lacks adjustability in the size and shape of its orifice. Corresponding components of the machine, including the wafer trays or chutes, will conform to a specific size and shape to optimize the speed and accuracy of the delivery of the wafers for the fabrication of the sandwich product, and are likewise incapable of adjustment.

As a result thereof, diverse individual machines must be manufactured and maintained by a sandwich manufacturer if demand for products of differing dimension and shape is to be effectively commercially met. Problems frequently arise in the instance where particular demands for given products may fluctuate, and may thereby exceed the capabilities of the equipment on hand. To date, the equipment in question has been incapable of rapid retrofitting to accommodate diversities in product dimensions and other characteristics.

Concomitant with this problem is the difficulty that is inherent in most sandwich making equipment, for effective and rapid maintenance. Most sandwich equipment is manufactured on a standard conveyor-type construction with parallel supporting members having the movable parts of the machine disposed therebetween. Likewise, chain drives, nozzles and other operative parts involved in the fabrication process are located in positions that are difficult to access and correspondingly more difficult to clean. This represents a significant expenditure of downtime when a given piece of equipment is to be periodically inspected and cleaned or overhauled.

In view of the above, a need clearly exists for the development and use of sandwich making machines that are capable at once of modification on a rapid basis to accommodate differences in the dimensions and other characteristics of the sandwich products being fabricated, and are likewise constructed with their primary components readily accessible for ease of cleaning and maintenance. It is toward the satisfaction of the aforementioned objectives that the present invention is directed.

SUMMARY OF THE INVENTION

In accordance with the present invention, an apparatus for the manufacture of sandwich-type comestible products is disclosed which comprises a generally horizontal conveyor means which, in a particular embodiment, comprises paired parallel such conveyors. The conveying means has an input end and a discharge end. The apparatus also comprises a wafer dispensing means comprising a first wafer dispenser station for the discharge of a first wafer, which is discharged with the open face of the wafer vertically upward, an extrusion station for the conjoint delivery of a flowable comestible product through paired extrusion nozzles disposed in side-by-side relationship, said extrusion nozzles being capable of individual removal and replacement to define orifices of different size and shape. The extrusion station includes means for severing the extruded comestible material from the extrusion die so as to define a quantity of comestible of a predetermined height. The severing means may comprise a heated wire member that is reciprocated across the lower edge of the die orifice to effect such severing. In a particular aspect, the heated wire member describes an essentially rectangular path in its travel.

The apparatus further includes a second wafer dispensing station located downstream of the extrusion station, for the dispensing of a second wafer with its open face in position to lie on top of the extruded comestible material and to thereby form the completed wafer product. Tamping means for the securement of the last applied wafer to the extruded product is disposed just downstream of the second wafer dispensing means. The fabricated sandwich product exiting from the wafer tamping means is conveyed to the discharge end of the apparatus for further processing, such as for packaging and delivery.

In a particular embodiment of the invention, the apparatus defines parallel tracks and corresponding dual wafer dispensers, extruding heads and tamping means for the simultaneous fabrication of plural sandwich products. A feature of the invention is the modular construction thereof, in that the wafer dispensing chutes and the extrusion nozzles are removable and may be easily replaced with units defining products of different size and shape. The specific construction of the present apparatus facilitates the conjoint manufacture of products of differing shape, as one of the two parallel tracks or lines may be fitted with dispensing and extruding hardware of a particular shape that is nonetheless different from the shape being defined by the equipment disposed on the other track.

The conveyor and its component parts are likewise adjustable to accommodate differences in the size of the products being manufactured. Such adjustment is effected by the movement of the conveyor, and particularly by the movement of the paired rails of each conveyor line in relation to each other. Thus, and in the instance where products of divergent size are being manufactured, one of the conveyor lines may be so adjusted by the movement of its rails closer to each other and preferably symmetrically about a common center position, while retaining the original spacing of the other conveyor line. This is possible inasmuch as the conveyors, like the remainder of the parts of the present apparatus, are disposed along essentially horizontal rods or rails and are adjustable by movement therealong.

A further feature of the invention, in addition to its modularity, is that all of the associated processing means with the exception of the conveyor, including the wafer dispensing means, and the extrusion means and cutting means, are mounted on a base comprising a support wall. Thus, the aforementioned components of the apparatus of the present invention are mounted in cantilevered fashion on a vertical support wall and are thereby highly accessible and visible for the repair, retrofitting and sanitation thereof in use.

More particularly, the extrusion station or assembly is mounted on parallel support rods that extend horizontally from the vertical support wall, and along which the extrusion nozzles will extend. The extrusion assembly includes a generally Y-shaped extrusion conduit which terminates in parallel heads, each adapted to receive extrusion nozzles or dies of a predetermined shape. The entire extrusion assembly is capable of reciprocation away from the vertical support wall and beyond the conveyor, to facilitate cleaning and replacement of the extrusion dies, and to enable the commencement of operation of the apparatus to proceed without the unwanted excess discharge of comestible material into the workings of the conveyor, all as explained later on herein.

The extrusion severing means comprising the heated wire is adjustable in its speed of operation, and may, in one embodiment, be retarded in motion to accommodate differences in product size and comestible buildup that occur during production. The apparatus of the present invention represents a departure in the fabrication of ice cream sandwiches, and more generally, a significant departure and development with respect to the manufacture of comestible-containing sandwich products at large. The ability to replace certain of the parts of the apparatus to accommodate differences in products, and to easily adjust the remaining parts, offers a versatility that has not been available in the prior art. Moreover, the cantilevered construction of the machine of the present invention facilitates not only its ease of retrofitting but improves the visibility of all primary running components and thereby expedites and improves the capability of inspection, repair and cleaning thereof.

Accordingly, it is a principal object of the present invention to provide an apparatus for the manufacture of sandwich-type comestible materials in the linear direction, that utilizes a sequential assembly including the extrusion of a flowable comestible product on top of a wafer, wherein the apparatus is capable of adjustment to accommodate the manufacture of comestible sandwich-type products of differing size.

It is a further object of the present invention to provide a machine as aforesaid that is of modular construction and facilitates the ease of removal and retrofitting of particular components thereof to accommodate such differences in the size and shape of sandwich products being prepared.

It is a yet further object of 6he present invention to provide a machine as aforesaid that is so constructed as to enhance the ease of repair, retrofitting and cleaning.

Other, objects and advantages will become apparent to those skilled in the art from a review of the ensuing description taken in conjunction with the following illustrative drawings.

BRIEF DESCRIPTION OF THE DRAWINGS

FIG. 4 is a side view depicting a wafer chute in accordance with an embodiment of the invention;

FIG. 5 is a front view partly broken depicting plural wafer chutes mounted on corresponding support plates resident on the apparatus of the present invention;

FIG. 6 is a top view partly broken of the mounted conveyor chutes of FIG. 5;

DETAILED DESCRIPTION

In its broadest aspect, the present invention relates to an apparatus for the preparation of sandwich-type comestible products, which comprises a base providing bilateral support for a conveyor means and including a vertically extending support wall, an essentially horizontal conveyor having an input end and a discharge end, a wafer dispensing means comprising a first wafer dispenser station defining a chute for the delivery of a first wafer with its open face directed vertically upward, comestible extrusion means for the deposit of a quantity of a comestible material on said open wafer, cutting means for the severing of the comestible product thus deposited from the extrusion means, a second wafer dispenser station for the disposition of a wafer on top of the open face of said comestible product to form the sandwich thereof, and means for securing the second wafer in position on said comestible product, wherein the wafer dispensers and extruder nozzles are mounted on the vertical support wall in cantilevered disposition and are removable and replaceable, and each of the conveyor lines comprising the conveyor means are adjustable in width, by the lateral adjustment of corresponding paired wafer support rails in relation to each other about a line of symmetry, or a center line. As described and illustrated herein, plural wafer dispensers are contemplated within the scope of the invention.

Figure 1:
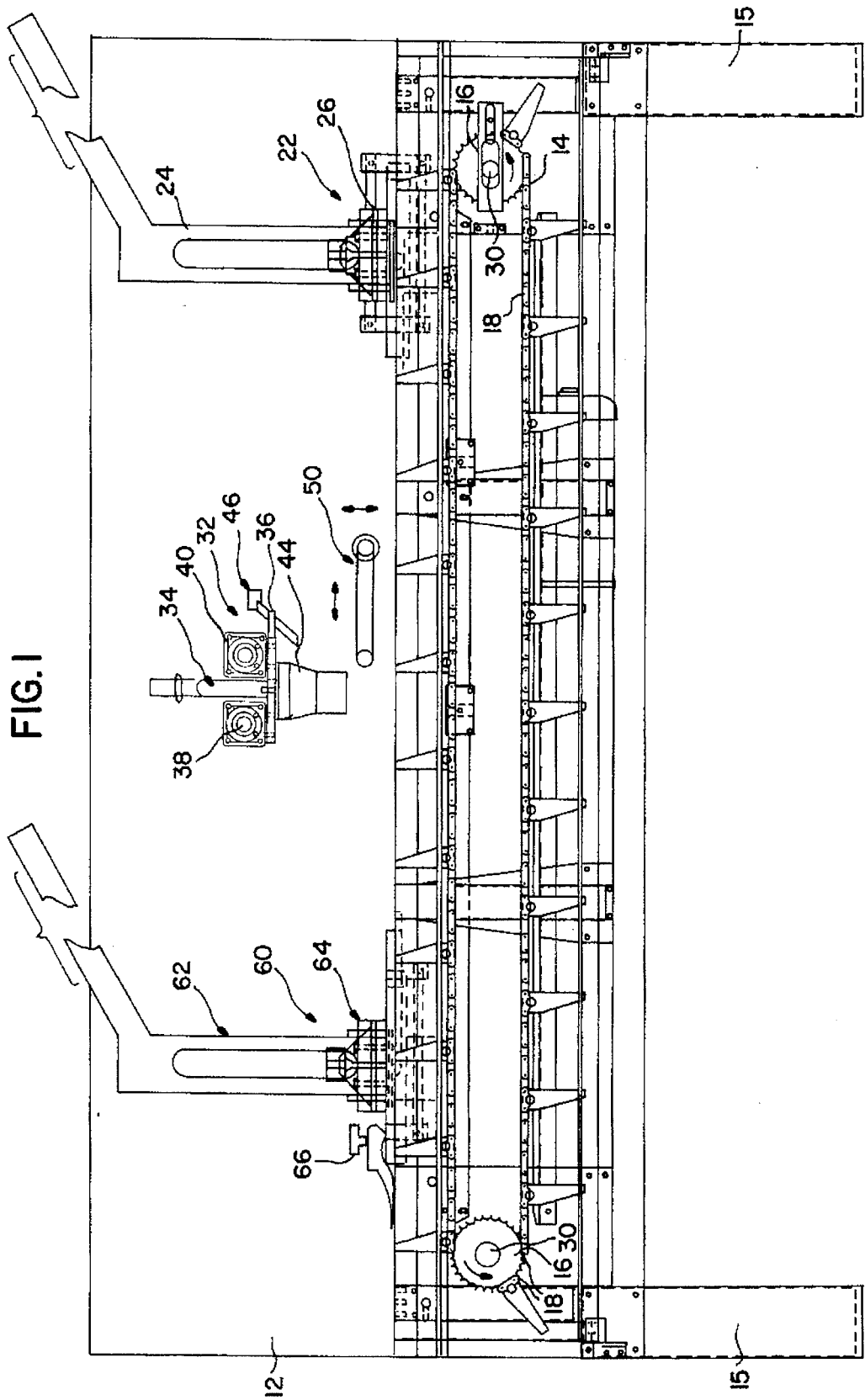
FIG. 1 is a front plan view of the apparatus of the present invention.
Figure 2:
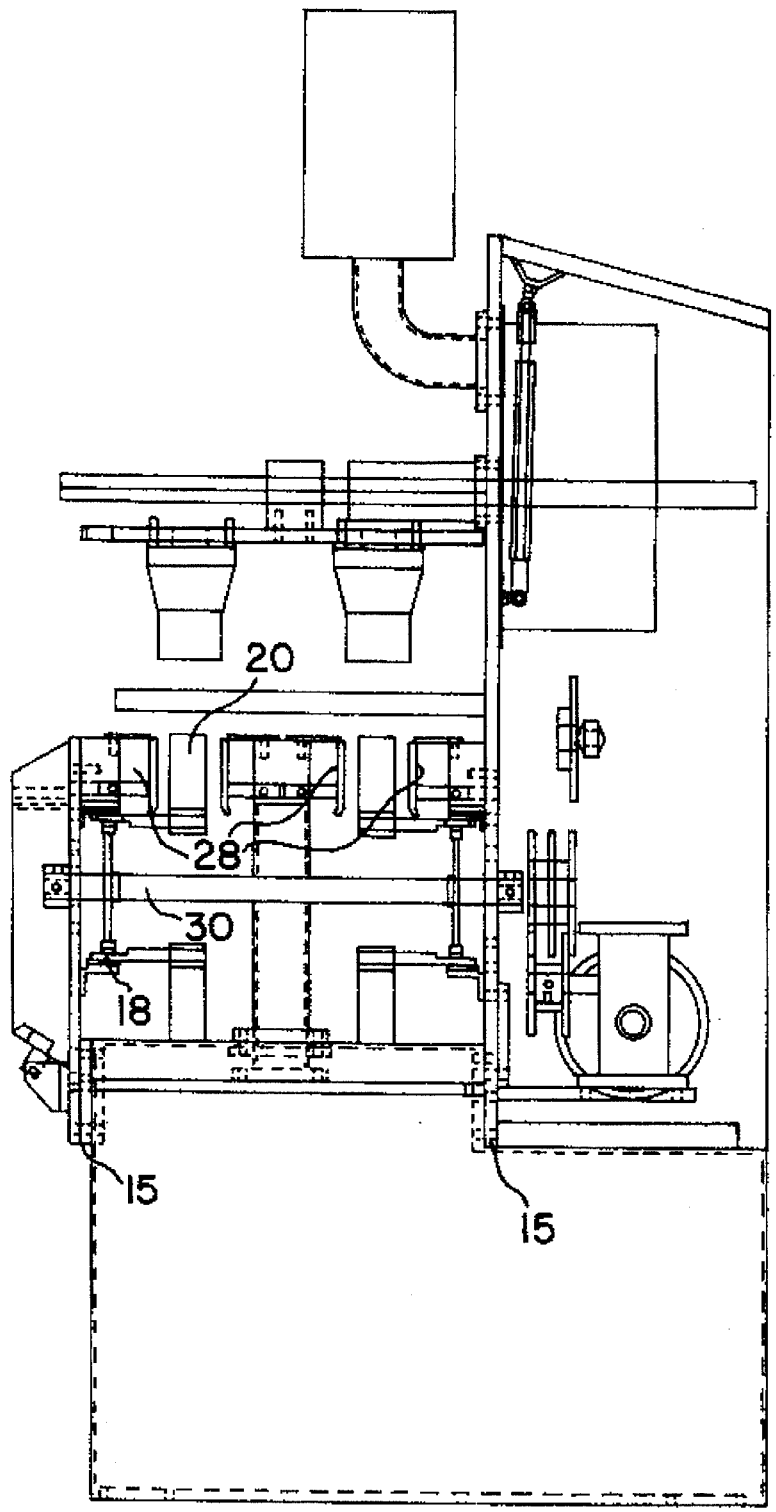
FIG. 2 is a side view thereof.

Referring now to the Figures, wherein like numerals denote like parts, and specifically with reference to FIG. 1, apparatus 10 comprises a vertical base or wall 12 on which certain of the components of the apparatus are directly mounted in cantilevered fashion. The mounting of said components on vertical wall 12 is best seen in FIG. 2, where it can be seen that particular components of the invention are disposed essentially in cantilevered fashion. Conveyor means 14 is suspended between vertical legs such as at 15 shown in FIG. 1, that provide bipolar lateral support.

Referring further to FIGS. 1 and 2, conveyor means 14 comprises a chain type conveyor comprising axles 30, located at both the infeed and the output ends, respectively, of conveyor means 14, and utilizing paired sprockets 16 and corresponding multiple chains 18 traveling thereabout. Regularly spaced fingers 20 are mounted in relation to chains 18 in cantilevered fashion as shown, and are positioned and configured to urge products forward during the manufacturing process.

Referring again to FIG. 1, apparatus 10 includes a wafer dispensing means 22 which comprises a first wafer dispenser station comprising at least one wafer dispensing chute 24 that is detachably attached to a base assembly 26. Two such wafer dispensing chutes 24 are illustrated in FIG. 2. The configuration of the chutes and their association with the base assembly is best seen in FIGS. 4–6. With specific reference to FIG. 6, wafer dispensing chute 24 defines at its lowermost portion an opening that corresponds to the shape of the wafer being dispensed. This assures that an accurate discharge of a single wafer will occur on a sequential basis, and likewise prevents jamming of wafers being loaded into the dispenser or chute.

In an aspect of the present invention, the wafer chute 24 is removable and may be replaced with a corresponding chute of general configuration and size, but with an internal configuration or diameter that conforms to the shape of the intended ice cream product. Thus, for example, while a square configuration is illustrated in FIG. 6, it is to be understood that oval, round, and other corresponding configurations are contemplated within the scope of the present invention.

Further, with reference to FIG. 6 and as shown generally therein, the wafer dispensing chutes 24 terminate in baseplates 27 that are adapted for detachable attachment to support 26 by bolts or the like illustrated generally in the Figure. The schematic nature of FIG. 6 depicts the opening 29 described earlier, which opening corresponds to the outer perimeter or configuration of the wafer to be deposited on the conveyor. As understood, the exact configuration of opening 29 may vary accordingly.

With further reference to FIG. 4, a representative wafer chute 24 is shown in side view, and the specific configuration thereof can be appreciated. That is, the chute comprises a vertical channel 31 which terminates at its uppermost portion in an inclined extension 33. The construction of wafer chute 24 includes openings 35 that facilitate inspecting of the wafer contents to detect misfed or broken wafers and to access the same for removal. The foregoing construction, however, may be modified by the absence of opening 35, all within the scope of the present invention.

It can be seen from the above and foregoing that the cantilevered construction of the apparatus of the present invention and its reliance upon the vertical wall 12 for support and operation, places the operable components of the apparatus in clear and unobstructed position, visible for removal, repair and cleaning. Moreover, the adjustability of the conveyors themselves in conjunction with the removeability and modular construction of the wafer chutes and the extruder nozzles, makes it possible to convert a given apparatus to accommodate fluctuations in demand for specific sandwich-type comestible products, without the need for maintaining a large inventory of apparatus of differing dimensions.

Also, as indicated earlier, the present invention is predicated upon the disposition of plural conveyor tracks for the concurrent preparation of plural sandwich products. Thus, and with reference to FIGS. 2, 5 and 6, it can be seen that the dispenser assembly 22 may, in a particular embodiment, comprise parallel wafer chutes 24 that are mounted to the base assembly 26, itself capable of receiving and securing such chutes in side-by-side parallel relationship.

While not specifically illustrated herein, it can be visualized and the invention contemplates that differing wafer chutes may be disposed in side-by-side relationship with respect to each other, to facilitate the concurrent manufacture of sandwich-type comestible products of differing shape, size, etc. The invention is specifically intended to contemplate and cover such variations within its spirit and scope.

Referring again to FIG. 1, the conveyor is adjustable to accommodate differences in the size and particularly the width dimension of the comestible products being manufactured. Thus, and with particular reference to FIG. 2, the side rails 28 of each conveyor line are independently laterally adjustable and are able reciprocate with reference to each other. For example, and within the scope of the present invention, it is contemplated that the conveyor line located distal to the vertical wall 12 may be adjusted to accommodate the manufacture of a sandwich-type comestible product of decreased width, while the adjacent conveyor line may retain its original spacing to accommodate a sandwich product of greater width. Likewise, both rails and the entirety of the assembly may be adjusted concurrently and equally, as illustrated. Such adjustments are made in the horizontal plane, and with reference to a center line in each conveyor line, by the translation of rails, sprockets, etc., along the primary support axes including the axis of rotation, such as axle 30, of conveyor means 14.

Figure 8:
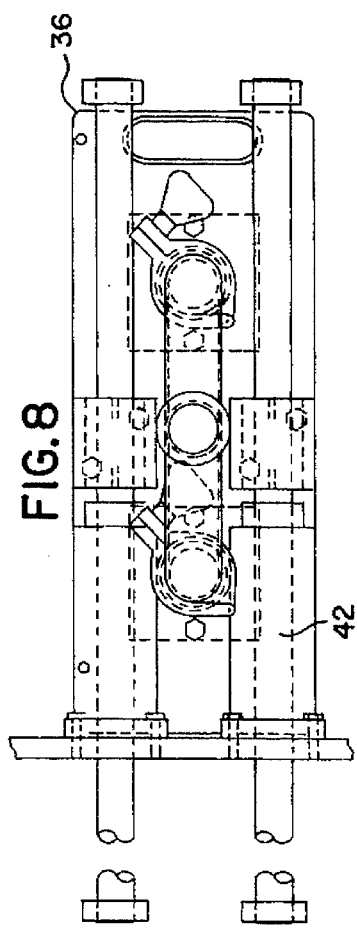
FIG. 8 is a bottom view of the extruder assembly of FIG. 7, with the extruder nozzles removed.
Figure 7:
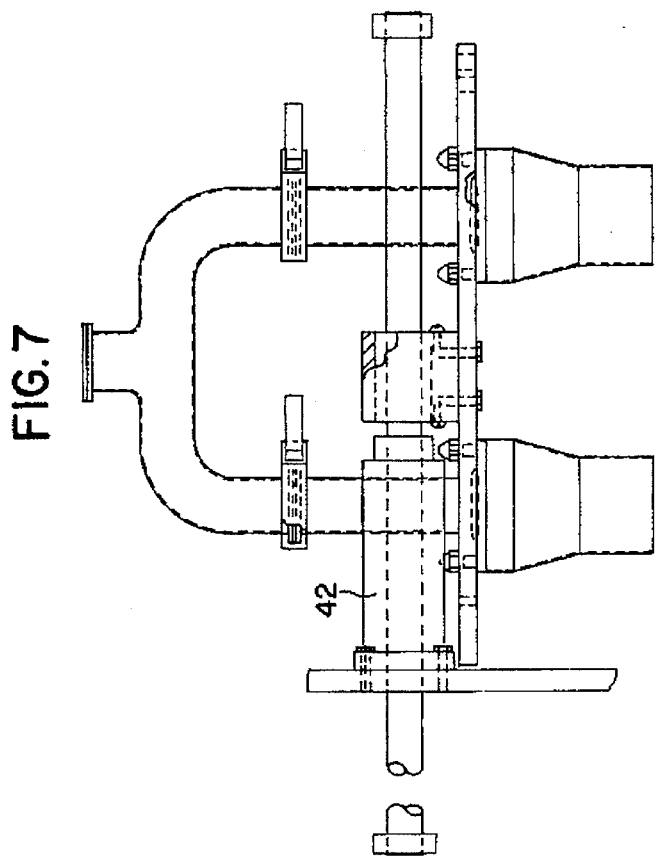
FIG. 7 is a side view partly in phantom and partly broken, illustrating the extruder assembly of the apparatus of the present invention.

Referring again to FIG. 1, the wafers deposited on the conveyor 14 travel forward toward extruder assembly 32, where a quantity of a flowable comestible product is dispensed vertically downward thereon. Extruder assembly 32 comprises, in its illustrated aspect, an essentially inverted U-shaped extruder duct 34 that terminates in a supporting face plate 36 best seen in FIG. 8, that is part of a trolley-type mechanism resting on paired parallel horizontal rods 38. Trolley mechanism 40 comprises supporting blocks 42 associated with face plate 36, which supporting blocks are journaled to reciprocate along rods 38. As illustrated in the Figures, trolley 40 is disposed for operation adjacent wall 12. It is to be understood, however, that the trolley 40 may travel horizontally outward and away from wall 12 to an extent not shown, so that it resides beyond conveyor 14. As will be discussed later on herein, such movement is desirable in the instance where the extruder assembly is to be cleaned or extruder nozzles 44, discussed hereinafter, are to be changed.

One of the aspects of the present invention is the modularity of its components. In the instance of extruder assembly 32, this is represented by the interchangeability of extruder nozzles 44 as shown and their replacement with nozzles of differing internal diameter and shape, to accommodate corresponding differences in the shape of the desired comestible product to be extruded. Although not specifically illustrated herein, it is to be understood that extruder nozzles 44 may define a round, i.e., circular, or ovoid shape, or a rectangular, i.e., square, shape, depending upon the specific product that is desired for production. Each of the extruder nozzles 44 has identical means for detachable attachment to endplate 36 to facilitate their interchangeability. In practice, the removal and replacement of extruder nozzles 44 is accomplished by moving extruder assembly 32 distally away from wall 12, and then unfastening the nozzles and replacing them with the desired nozzles for the next round of production.

The positioning of extruder assembly 32 securely in place for production is accomplished by means of a locking device shown generally at 46 in FIG. 1. The locking device comprises a rotating rod that travels the length of endplate 36 and is parallel to support rods 38. A handle is attached to the distal end of the rod, while a finger is attached to the proximal end. The rod is spring biased and is thereby adapted to snap into place in a corresponding recess defined in a catch that is disposed and connected to vertical wall 12, all as generally shown. In practice, the rotation of the handle portion 48 in the counterclockwise direction disengages the locking means and permits the forward motion of the extruder assembly away from wall 12. Naturally, the locking assembly could be disposed on the other side of endplate 36, in which event it would operate in the reverse direction on engagement and disengagement. The invention is therefore intended to cover such variations within its spirit and scope.

Figure 9:
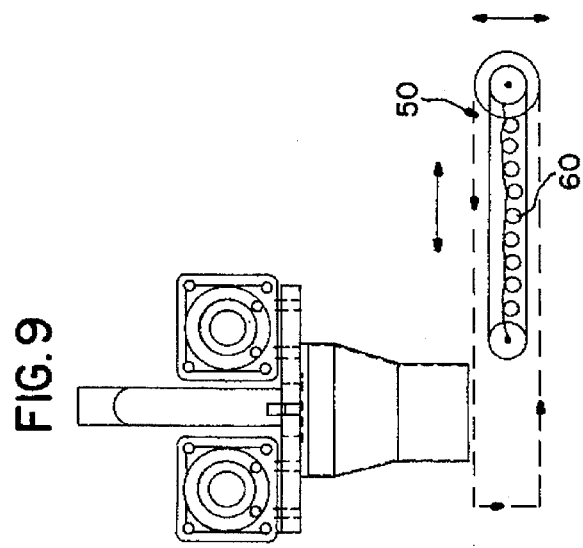
FIG. 9 is a schematic view showing the interaction of the extruder assembly and the product cutting means.

Referring now to FIGS. 1 and 9, the completion of the extrusion of the quantity of the comestible material onto the first wafer is followed by the severing of the comestible product from the extruder nozzle by the reciprocation of wire cutting means 50. Wire cutting means 50 is an essentially U-shaped member having a support rod extending horizontally out of back wall 12, which support rod contains electrical connection to energize the corresponding wire member best shown in FIG. 2. More particularly, cutting means 50 comprises a primary support sleeve 52 from which parallel arms 54 extend forwardly as shown. The distal ends of arms 54 terminate in insulated tips 56 between which extends a heatable wire 58. As shown in FIG. 9, wire 58 may be maintained in secure and tensioned linearity by the disposition of coil spring 60 schematically shown. Naturally, other tensioning means within the skill of the art may be utilized, and the invention is not to be considered as limited to the provision of a coil spring as illustrated.

The specific travel of the cutting means 50 is schematically illustrated with reference to FIG. 9. Particularly, and in its initial and retracted position, cutting means 50 is disposed a distance below the plane containing the opening of the extrusion nozzle. On activation, cutting means 50 is first moved vertically upward and then moved forward toward and past the edge of extrusion nozzle 44 to effect the severing of the extruded comestible material. On its return stroke, however, the cutting means 50 first translates downward and then retracts in this lowered position, so as to avoid impeding the orderly flow of additional comestible material to the next available wafer. It can be appreciated that the speed of operation of apparatus 10 is such that even the rapid reciprocation of cutting means will encounter on the return stroke the dispensing of comestible material onto the next available wafer. The lowering of the wire cutter in this fashion avoids disturbing the continuity and integrity of this subsequent extrusion, while returning the cutting means 50 to its starting position to facilitate a repetition of its operation.

After the comestible material has been extruded and cut as described above, it is indexed to the second wafer dispensing means or station 60, likewise comprising a wafer chute 62 and corresponding base 64 for detachable attachment thereof. At this station, the second wafer is deposited, open face down, to form the completed comestible sandwich. A tamping means 66, schematically illustrated in FIG. 1, is disposed and works preponderantly by its weight and by gravity to lightly tap the upper wafer of the sandwich product as it exits the second dispensing station, to further secure the integrity of the thus formed sandwich product. The conveyor then moves the sandwich products thus formed to the discharge end thereof, where it may directed thencely to a wrapping station and/or for further processing.

As discussed earlier, the apparatus of the present invention is preponderantly constructed about a single vertical wall. Moreover, certain of the components of the apparatus, and particularly the dispensing trays or chutes and the extruder nozzles, may be entirely removed and replaced with nozzles of differing internal shape to facilitate the fabrication of products of differing thickness, configuration or diameter. Also, and as described, the rails 28 of each of the conveyor lines are independently laterally adjustable with respect to each other, to accommodate differences in product size. While the adjustment of the rails 28 has been described, it is to be understood that other forms of adjustment are likewise contemplated, including the adjustment of corresponding sprockets 16 not fully shown, which would in turn, move the chains 18 inward or outward in like relation to that described for rails 28, to effect the desired width adjustment. In the instance where sprockets 16 are so adjustable, such adjustment may be effected by a variety of means, including the disposition of a series of notches or indentations, not shown, on axle 30, and corresponding pivotable dogs, not shown, that could be screw rotated into and out of engagement with such notches to effect a quick and accurate lateral adjustment along axle 30. Naturally, other forms of adjustment and attachment of sprockets to axles are contemplated herein, and the foregoing is provided by way of illustration and not by way of limitation.

Figure 3:
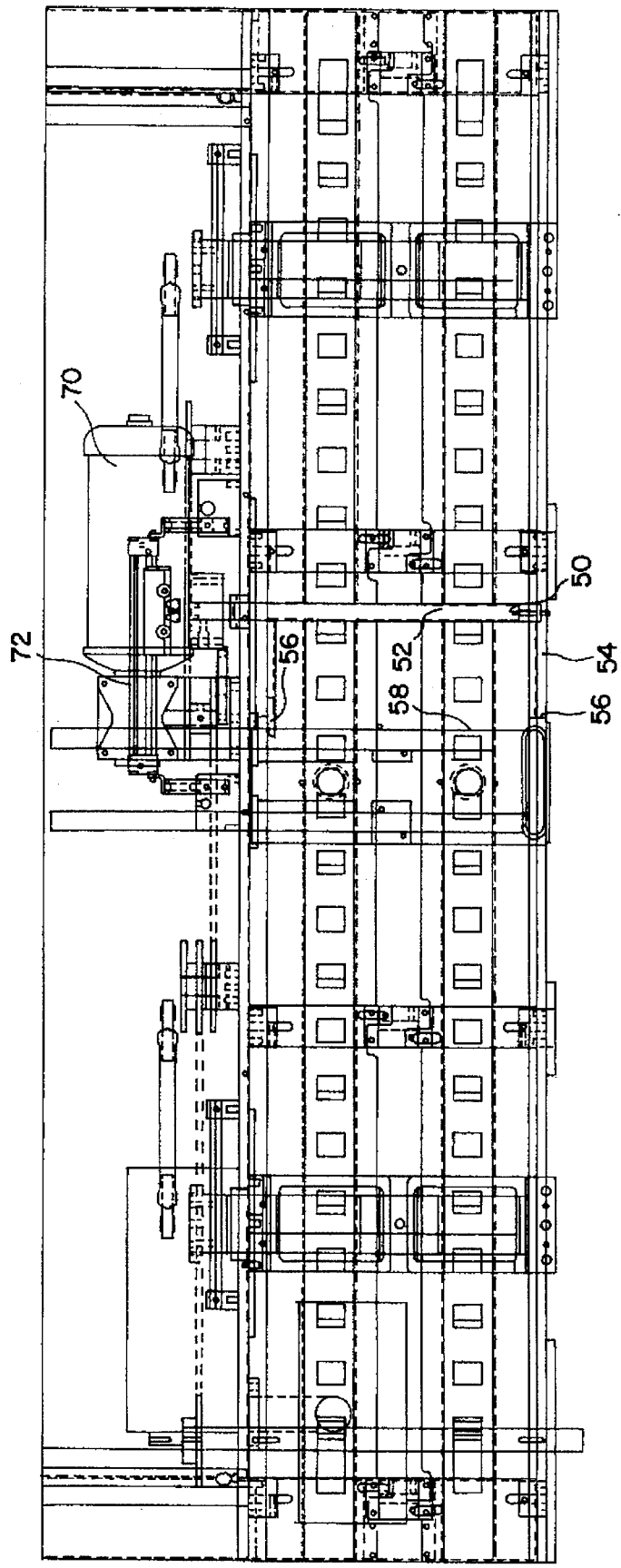
FIG. 3 is a top view thereof.

Referring further to FIGS. 2 and 3, a schematic representation of the actuating means of the present invention is shown. The apparatus may be actuated by the operation of a single electric motor which in turn, is connected by coordinated chain drives, so that the movement of the conveyors, the extrusion of the comestible product and the sequential disposition of the wafers, both before and after extrusion, is centrally controlled. Wire cutting means 50 as illustrated, is actuated by a reciprocable air cylinder generally identified at 72 in FIG. 3. The operation of air cylinder and consequently the reciprocation of cutting means 50 may be controlled in its timing, by the retardation or advancement of same, to account for variations in buildup of comestible material along the heated wire, or other circumstances warranting such adjustment. Correspondingly, to the extent that specific functions of the machine require predetermined programming, appropriate electrical connection to devices such as programmable logic controllers, not illustrated herein, are made that assure coordination of all machine sequences and functions.

Having described specific preferred embodiments of the invention with reference to the accompanying drawings, it will be appreciated that the present invention is not limited to those specific embodiments, and that various changes and modifications can be effected therein by one of ordinary skill in the art without departing from the scope or spirit of the invention as defined by the appended claims.

What is claimed is:

1. An apparatus for the preparation of sandwich-type comestible products, comprising:

a base providing bilateral support for a conveyor means and including a vertically extending support wall;

a substantially horizontal conveyor means having an input end and a discharge end;

wafer dispensing means mounted above said conveyor means to dispense sandwich wafers sequentially thereon, said wafer dispensing means comprising a first dispensing station comprising at least one chute located adjacent the input end of said conveyor means for the dispensing of a first wafer, and a second dispensing station comprising at least one chute located proximal to the discharge end of said conveyor means for the dispensing of a second wafer to complete the formation of said sandwich-type comestible product;

extrusion means attached to said base and located vertically above said conveyor means and approximately medial to said input end and said discharge end, said extrusion means defining plural extrusion nozzles for the concurrent dispensing of separate quantities of comestible material; said extrusion means including comestible severing means reciprocably mounted adjacent to said extrusion nozzles, and positioned to pass across said extrusion nozzles to sever said comestible material thereby;

wherein said dispensing chutes and said extruder nozzles are of modular construction and adapted for removal and replacement with units of differing size; and wherein said wafer dispenser means and said extrusion means are mounted in cantilevered fashion on said vertical support wall.

2. The apparatus of claim 1 wherein said conveyor means comprises side-by-side plural conveyors facilitating the concurrent preparation of plural sandwich-type comestible products; said wafer dispensing means comprise correspondingly paired first and second wafer chutes, and said wafer chutes and said extrusion nozzles are individually replaceable to facilitate the concurrent preparation of sandwich-type products of differing shape and size.

3. The apparatus of claim 1 wherein said extrusion assembly is reciprocably mounted on said base and is movable from a first position in alignment with said conveyor means to a second position out of the way of said conveyor means, in a plane perpendicular to the plane containing said base.

4. The apparatus of claim 1 wherein said second wafer chute includes tamping means positioned immediately downstream of said chute and operating by gravity to firmly engage said wafer with said comestible material in the finally formed sandwich-type comestible product.

5. The apparatus according to claims 1 or 2 wherein said conveyor means comprises individual chain-driven conveyors, said conveyors comprising paired endless chains with corresponding paired sprockets at said input end and said discharge end, said sprockets adapted for rotatable movement in use, and regularly spaced finger members communicating with said chains, and extending upward and away from the axis of rotation thereof, to engage sequential wafers and comestible products to convey the same from said input end to said discharge end.

6. The apparatus according to claim 5 wherein said conveyor means each defines a first inboard conveyor chain and corresponding pair of sprockets and a second outboard conveyor chain and corresponding pair of sprockets, and said conveyor assembly is adjustable in width by the movement of said outboard chains and sprockets into or out of proximity with said inboard chains and sprockets.

* * * * *

UNITED STATES PATENT AND TRADEMARK OFFICE
CERTIFICATE OF CORRECTION

PATENT NO. : 5,540,141
DATED : July 30, 1996
INVENTOR(S) : Yancey Grubzak

It is certified that error appears in the above-indentified patent and that said Letters Patent is hereby corrected as shown below:

On the Title page, please add item [73] Assignee:

--INTERBAKE FOODS, INC.
RICHMOND, VIRGINIA--

Signed and Sealed this

Twenty-fourth Day of December, 1996

Attest:

BRUCE LEHMAN

*Attesting Officer*     *Commissioner of Patents and Trademarks*